United States Patent [19]

Teichmann

[11] 4,370,297

[45] Jan. 25, 1983

[54] METHOD AND APPARATUS FOR NUCLEAR THERMOCHEMICAL WATER CRACKING

[75] Inventor: Theodor Teichmann, Plymouth, Mich.

[73] Assignee: Texas Gas Transmission Corporation, Owensboro, Ky.

[21] Appl. No.: 703,197

[22] Filed: Jul. 7, 1976

Related U.S. Application Data

[63] Continuation-in-part of Ser. No. 414,369, Nov. 9, 1973, abandoned.

[51] Int. Cl.$^3$ .................................................. G21B 1/00
[52] U.S. Cl. ........................................ 376/148; 55/16; 376/324
[58] Field of Search ................ 176/1, 39, 9, 3; 55/17, 55/16; 423/644, 655–657; 204/157.1 H; 376/148, 314, 324

[56] References Cited

U.S. PATENT DOCUMENTS

| 3,489,645 | 1/1970 | Daiber et al. | 176/1 |
| 3,725,271 | 4/1973 | Giannotti | 55/17 |
| 3,762,992 | 10/1973 | Hedstrom | 176/1 |
| 3,821,358 | 6/1974 | Interrante et al. | 423/657 |
| 3,901,669 | 8/1975 | Seitzer | 55/16 |
| 3,967,215 | 6/1976 | Bellak | 176/9 |
| 4,121,984 | 10/1978 | Gomberg et al. | 376/148 |
| 4,145,269 | 3/1979 | Teitel | 176/9 |

FOREIGN PATENT DOCUMENTS

| 1240668 | 4/1960 | France | 176/1 |
| 755903 | 8/1956 | United Kingdom | 176/1 |
| 774052 | 5/1957 | United Kingdom | 176/1 |
| 908469 | 10/1962 | United Kingdom | 176/39 |

OTHER PUBLICATIONS

Controlled Nuclear Fusion–Current Research and Potential Progress, 1978, pp. VII, VIII, 5–8, 14–16, 33–36.
Technology Review, pp. 20–24, 32–34, 39, Dec. 1976.
"Exploding Reactors for Power", Marwick, 1/27/73, pp. 11, 12, 20.
Nuclear News, 5/75, pp. 79, 80.
WASH-1267, Jul. 1973, pp. 5, 6, 10, 12, 13, 20, 21, 28, 31–34.
ERDA-28, 1/75.
The Wall Street Journal, Tues., May 26, 1981, p. 35, Article by J. E. Bishop.
Nuclear News, 8/80, pp. 64–68.
Nuclear News, 4/80, pp. 77–78.
Nature, vol. 281, 10/79, pp. 414–415.

*Primary Examiner*—Harvey E. Behrend
*Attorney, Agent, or Firm*—Laurence R. Brown

[57] ABSTRACT

A method and apparatus for dissociating steam in a fusion reaction central chamber. The charged particle energy from an ignited fusion fuel pellet is directed to and distributed in a suitable volume of steam, bringing the steam to temperature and pressure conditions leading to dissociation into hydrogen and oxygen. The resulting atomic and molecular velocities are sufficiently high to allow egress of the separated products through a suitable shaped nozzle prior to recombination, making it practical to separate and capture the dissociated products.

9 Claims, 2 Drawing Figures

METHOD AND APPARATUS FOR NUCLEAR THERMOCHEMICAL WATER CRACKING

This application is a continuation-in-part of U.S. Ser. No. 414,369 filed Nov. 9, 1973, now abandoned.

This invention relates to a Method and Apparatus for Nuclear Thermochemical Water Cracking and in particular utilizes the charged products from a nuclear fusion reaction for obtaining the dissociation of water into hydrogen and oxygen.

BACKGROUND

Much work is presently being done on the achievement of ignition and burn of fusion fuel such as, for example, deuterium-tritium in pellet form. While there are a number of different approaches to this problem, one of them includes the utilization of a source of energy from a laser and particular pellet configurations which will make it possible to achieve ignition and burn in a reaction chamber. Patents which illustrate generally the apparatus which can be used in this type of system are:

Hedstrom: U.S. Pat. No. 3,762,993—Oct. 2, 1973;
Whittlesey: U.S. Pat. No. 3,378,446—Apr. 16, 1968;
Daiber: U.S. Pat. No. 3,489,645—Jan. 13, 1970.

Many other U.S. patents issued in this field recently, e.g. U.S. Pat. Nos. 3,802,993; 3,748,226; 3,624,239; 3,152,958; 3,037,922; 3,748,226 and 3,152,958, exemplify the state of the art for production of chemicals by exposure to nuclear radiation in both fusion and fission reactor environment.

Publications which show the details of construction of the reactors, laser systems and report the status of the art include:

(a) Research/Development, May 1975, Vol. 26, No. 5, pp 55ff., "Thermonuclear fusion research with high-power lasers", an article showing fusion optics structure and requirements.

(b) "Plasma Physics and Controlled Nuclear Fusion Research", 1974, Vol. II, International Atomic Energy Agency Vienna, which defines detailed conditions of target physics in laser fusion reactions.

(c) Laser Focus, September 1975, pp 39ff., "More Evidence that Fusion Works", an article showing the production of neutrons by the laser-fusion process.

(d) Advances in Nuclear Science and Technology, 1962, Academic Press, a general report of chemonuclear reactors and chemical processing.

(e) KMS Optical Systems brochure pricing laser fusion systems and fuel pellets in the commercial market.

(f) A joint KMS Industries and General Electric catalog of commercially available Laser Systems for Plasma Research (E H M 12,214).

(g) Lawrence Livermore Laboratory reports including UCID 16850 reporting DT Fusion neutron radiation of various chemicals.

(h) "Advances in Activation Analysis", Vol. 2, Academic Press, 1972, activation analysis with 14 MeV neutron generators, and (i) "The relevance of various neutron sources to Fusion-Reactor Radiation Effects", Nuclear Technology, Vol. 22, April 1974.

All of the aforesaid art is incorporated into and made part of this specification and disclosure.

Therefore, it is clear that the status of the art is well known, and it is unnecessary in this disclosure to obscure the nature of the invention in a myriad of details within the skill of those currently working in the nuclear arts.

OBJECTIVES

Current calculations of a first generation laser-driven nuclear fusion reaction utilizing deuterium-tritium pellets show that about 20 percent of the energy is available in the form of charged particles (particularly alpha-particles) which must be absorbed inside the reaction chamber, or on collision with the chamber wall.

If this available energy can be absorbed and utilized within the cavity, there are a number of advantages which will accrue as follows:

1. The energy will be available directly without the losses occasioned by passage through the chamber wall and possible exterior heat transfer loops;
2. Thermal and mechanical stresses in the chamber wall will be alleviated; and
3. The radiation damage to the chamber wall will be reduced.

It is, therefore, one of the primary objectives of the present invention to disclose a method and apparatus whereby an appreciable fraction of the fusion energy may be applied directly to the cracking of steam.

Another object of the invention is to improve the integrity of the fusion reaction chamber by reduction of the direct charged particle impact on the wall.

It is a further object of the invention to provide a source of hydrogen gas and oxygen from the dissociation of steam, each of which are valuable materials which may be utilized for additional sources of heat and fuel.

BRIEF DESCRIPTION OF THE INVENTION

The above, as well as other objects, features and advantages of the invention, will become apparent by reference to the following detailed description and claims wherein there is set forth the principles of the invention together with a description of the utility thereof in connection with the best mode presently contemplated for the practice of the invention.

THE DRAWING

Drawings accompany the application wherein there is illustrated:

In FIG. 1, a schematic view of a reaction chamber and the necessary connections thereto for the present apparatus.

In FIG. 2, a view of a particular separation nozzle.

DETAILED DESCRIPTION

Figure 1:
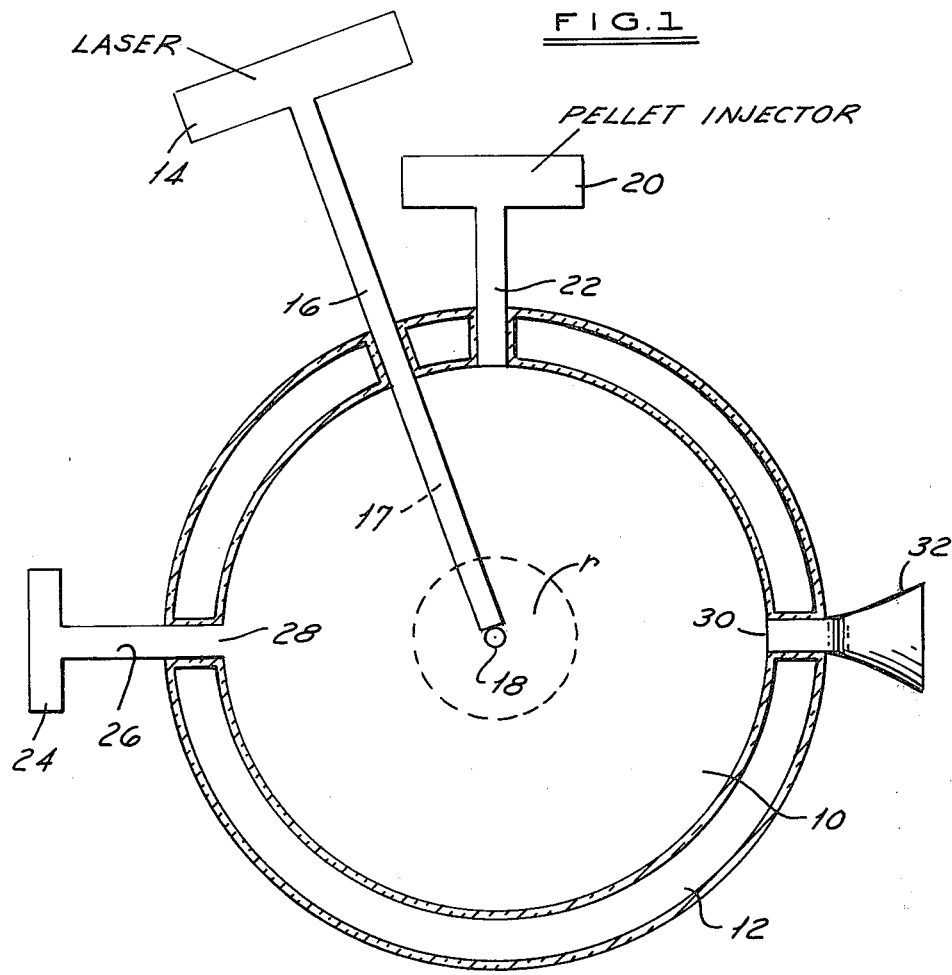

A central fusion reaction chamber 10 is formed by a surrounding neutron-moderating heat transfer and/or breeding blanket 12 which performs the usual functions of containment and heat recovery in common use in nuclear devices. The apparatus is operated by utilizing a source of energy from a laser 14 discharging through a channel 16 to the center of the reaction chamber where a pellet 18 will be provided in timely fashion for the laser pulse. A pellet injector housing 20 having an injector tube 22, leading to the center of the reaction chamber, is provided to place pellets sequentially into ignition position in a conventional manner. A chamber 24 is provided as a source of steam which will be transferred to the reaction chamber through a channel 26 and a port 28 at a suitable pressure. An effusion escape port 30 is provided from central chamber 10 leading to a nozzle outlet 32.

In the operation of the apparatus, the source of steam 24 is at appropriate pressure to inject a quantity of steam M (in Kilograms Kg) into the chamber having a radius R (meters, m) through the steam entry port 28 for each pellet. The laser fusion fuel pellet is, with suitable timing, injected through the pellet injector tube 22 from the storage chamber 20; and when it reaches the center of the chamber 10, the laser beam is fired through the external laser tube 16 and the interior protective tube 17, the latter being desirable to prevent the laser beam from being refracted and attenuated by the steam or possibly absorbed by breakdown of the steam. In some cases the pellet 18 may be mechanically positioned at the center of the chamber in the focus of the laser beam or brought to this position in any desirable way available in the art. With the energy of the laser focused on the pellet, there will be a release of a quantity of energy E (megajoules MJ) of which about one-fifth is in the form of alpha-particles of energy $3.52 \times 10^6$ electron volts (3.52 MeV).

The range r (centimeters, cm) of such particles in steam is given by the formula $r = 10.85 \, (R^3/M)$ having reference to the units above defined. This relationship follows from the data given in the following:

*Nuclear Engineering Handbook*, edited by H. Etherington, McGraw Hill, New York, 1958; and

*Nuclear Physics*, I. Kaplan, Edison Wesley, Cambridge, 1956.

The corresponding mass of the steam, m (grams, gm) in which the alpha-particle energy is initially deposited is thus $m = 1.28 \, (R^6/M^2)$: These quantities are preferably chosen so that $r < 100 \, R$, so that all of the alpha-particles are absorbed in the steam within the chamber. This requires that $M > 0.109 R^2$ for a typical configuration, $M \simeq 1$, $R \simeq 1$, so that $m \sim 1$.

The alpha-particle energy is thus initially absorbed in about one-tenth (0.1) of the volume of the chamber, surrounding the center which is heated to a very high temperature represented by the following:

$$T_o \simeq 10^5 \frac{M^2 E}{R^6} \; (°K., \text{ degrees Kelvin}).$$

Using the information in the 3rd Edition of the *American Institute of Physics Handbook*, edited by E. Gray, McGraw Hill, New York, 1972, it can be determined that the time for the heat to diffuse through the entire chamber is:

$$t \simeq \frac{2.5 \times 10^{-4} R^7}{M^{5/3} E^{4/3}} \text{ in seconds (s).}$$

Taking the above values, and $E = 20$, $t \simeq 4.6 \times 10^{-6}$ s. This is a very small value compared to the pulse rate of one-fifth of a second (0.2 sec) for injecting pellets in this general configuration and thus allows the steam to attain a uniform temperature T (°K) throughout the cavity, the relationship being $T = (131 \, E/M)$.

The equilibrium constant for thermal dissociation of the steam is then:

$$K = 1094 \exp\left(\frac{-13100}{T}\right)$$

$$= 1094 \exp\left(\frac{-100M}{E}\right)$$

This is in accordance with the information available in *Heat and Thermodynamics*, 5th Edition, M. W. Zemansky, McGraw Hill, New York, 1968.

The equilibrium pressure in the chamber can be defined as $p = (0.14 E/R^3)$ (atmospheres). The equilibrium degree of dissociation $\epsilon$ is given by the equation:

$$\epsilon = 1 - \left(\frac{p}{K^2} \times \frac{\epsilon^3}{2 + \epsilon}\right)^{\frac{1}{2}}.$$

When $R = 1$ and $M = 1$, $(p/K^2)$ is much less than 1 for E is $>$ than 20, so that the steam is almost completely dissociated under these conditions.

The mean temperature T is 2620° K., and the pressure 2.8 atmospheres. The mean molecular velocities under these conditions are $1.6 \times 10^5$ cm/s. With reference to *Modern Chemical Kinetics*, H. Eyring and E. M. Eyring, Reinhold Publishing Company, New York, 1963, the recombination coefficient of the hydrogen and oxygen of the dissociated steam under these conditions is estimated to lie in the range $0.3 \times 10^5$ cm$^3$/mole/s to $10^6$ cm$^3$/mole/s.

Accordingly, the amount of dissociated material effusing through an aperture is thus determined approximately by an equation of the form:

$$\frac{dm}{dt} = c M (M - m) - K m^2$$

Accordingly, the ultimate amount of emitted dissociated material is:

$$m_\infty = M [\sqrt{a + \tfrac{1}{4} a^2} - \tfrac{1}{2} a]$$

where M is the initial amount in the cavity and $a = (c/K)$ is the ratio of the escape velocity and the recombination constant in appropriate units.

Thus, for $0.17 < a < 0.5$ one has $.28 \, M < m_\infty < 0.5 \, M$. This indicates an external yield of dissociated material corresponding to the range 28 percent to 50 percent. The use of a nozzle such as shown schematically at 32 in the drawing and the diffusing material results in cooling and substantially reduces the chances of recombination. Because of the fact that the velocity of the hydrogen and the oxygen will be different, it is possible to maintain the separation of the gases and to capture them in isolated quantities.

In order to remove the separated products rapidly enough to ensure a reasonable yield and reduce recombination it is necessary to have the dissociated material move out as rapidly as possible and maintain (and indeed increase) its degree of separation. This may be accomplished by the use of a nozzle designed for supersonic flow (sonic velocity at the throat) [cf "Introduction to Aeronautical Dynamics" by M. Rauscher, (Wiley, NY 1953) p. 143f]; with such a nozzle one may estimate a fractional yield $(3 f_w t_f 10^3/R)$ grams per pulse, where $f_w$ is the fraction of the wall used for nozzle apertures, $t_f$ the flow time and R the chamber radius in meters as before. Taking $R=1$, $t_f=10^{-2}$ and $f_w=10^{-2}$, one obtains a yield of 30%.

Figure 2:
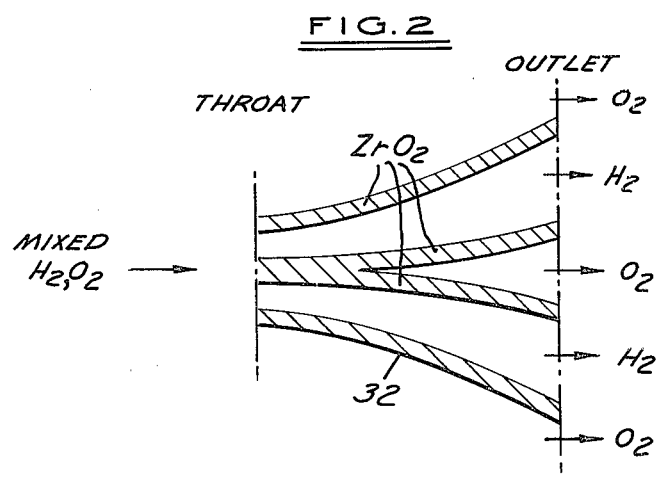

As shown in FIG. 2, in order to maintain (and accentuate) the separation of hydrogen and oxygen, a portion of the nozzle 32 may be constructed of a honeycomb or grid of zirconium dioxide ($Zr\ O_2$) a high temperature ceramic, through which oxygen diffuses much more rapidly than hydrogen. If a section of the nozzle is as shown in FIG. 2, there will be an additional separation as the dissociated gas passes through the nozzle. While the separation may not be complete, the various outlets shown will produce mainly $O_2$ or $H_2$ as shown.

It will thus be seen that there is described a method and apparatus for utilizing a nuclear fusion reaction source to heat steam by charged particle deposition and decompose it to hydrogen and oxygen and then allow these products to diffuse out of the reaction chamber before recombination can occur. It will be appreciated that the fusion source may be modified to produce most of its energy in charged particles and less in the form of externally deposited neutrons if the primary purpose is to crack steam. It has been found possible to reduce the recombination of the decomposed materials by cooling them as to effuse from the reaction chamber by the expansion nozzle provided or some other common means.

It will be appreciated that the above-described process may be either used as a part of a fusion reactor, primarily for the purpose of protecting the reaction chamber when steam cracking is not the primary or supplemental purpose of the system or it can be used as a primary source of hydrogen and oxygen devoted entirely to the production of those elements.

I claim:

1. Apparatus for dissociation of steam which comprises a fusion reactor central chamber housing capable of supporting a fusion reaction from a D-T fusion fuel charge placed therein, an energy source directed into said housing to achieve a fusion reaction in said fusion fuel placed in said central chamber to produce among other fusion products alpha and neutron radiation, means for introducing steam to said central chamber in the presence of said fusion reaction to absorb alpha-particle energy therefrom causing decomposition of the steam to release molecular hydrogen, and supersonic effusion filter means for removing the molecular hydrogen from other molecules including molecular oxygen in said central chamber, said supersonic effusion filter means forming an outlet from said central chamber and comprising a zirconium dioxide tube and a zirconium dioxide nozzle on said tube enlarging from said tube to a relatively wide outlet for cooling said molecular hydrogen, said nozzle having a hollow conically shaped zirconium dioxide member pointing in the direction of said central chamber, the zirconium dioxide walls of said nozzle and said conically shaped member allowing oxygen to preferentially diffuse therethough, thereby effecting the separation of the oxygen from the hydrogen.

2. Apparatus as defined in claim 1 in which said effusion outlet separates particles travelling at different speeds.

3. Apparatus as defined in claim 1 wherein said steam has a predetermined density and said central chamber has a size approximating the range of alpha-particles in said steam, thereby substantially absorbing that alpha-particle energy produced by said fusion reaction before it strikes the central chamber wall.

4. Apparatus as defined in claim 1 wherein said energy source is a laser source, and including protective means directing the laser energy to said fusion fuel through said steam without substantial refraction and attenuation by said steam.

5. Apparatus as defined in claim 1, wherein the pressure of said steam introduced in said central chamber is in the order of 2.8 atmospheres.

6. A method of utilizing nuclear laser fusion reactor energy to decompose water vapor into hydrogen and oxygen which comprises:
(a) introducing a quantity of fusion fuel into a fusion reactor central chamber in the form of a D-T pellet,
(b) directing laser energy toward said pellet to effect a fusion reaction producing among other fusion products alpha and neutron radiation,
(c) introducing a predetermined quantity of water vapor into said reactor central chamber prior to the reaction,
(d) decomposing the water vapor into molecular hydrogen and oxygen by exposure to said alpha radiation,
(e) separating the hydrogen and oxygen decomposition products, by effusing said decomposed products through a zirconium dioxide supersonic expansion nozzle having a hollow conically shaped zirconium dioxide member positioned substantially concentrically therein, said nozzle forming on outlet form said central chamber and wherein the zirconium dioxide walls of said nozzle and said conically shaped member allow oxygen to preferentially diffuse therethrough, thereby effecting the separation of the oxygen from the hydrogen,
(f) extracting from said expansion nozzle the decomposition product hydrogen as an output product.

7. The method as defined in claim 6 in which the separating step includes cooling said products as they are effused from a reactor to reduce recombination.

8. The method as defined in claim 6 including the steps of shaping the central reaction chamber spherically, and introducing a quantity M of water vapor in the form of steam related to the radius R of the spherical reaction chamber as follows:

$$M > 0.109 R^2.$$

9. The method as defined in claim 6 including the steps of providing predetermined reactor central chamber dimensions substantially limited to a known path length of alpha-particles released from said fusion reaction through said steam that utilizes substantially the entire alpha-particle energy in dissociating the water vapor into hydrogen and oxygen before it reaches the central chamber periphery.

* * * * *